(12) United States Patent
Smith (10) Patent No.: US 6,570,746 B1
(45) Date of Patent: May 27, 2003

(54) SYSTEM AND METHOD OF CLAMPING A CHARGER INPUT WHEN NO CHARGER IS DETECTED

(75) Inventor: Gregory J. Smith, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/062,797

(22) Filed: Jan. 30, 2002

(51) Int. Cl.[7] .................... H02H 7/00; H02H 3/00; H02H 9/00; H02J 7/00
(52) U.S. Cl. .................... 361/18; 361/18; 320/127
(58) Field of Search ................... 361/18, 55, 56; 320/127, 134, 135, 136, 137

(56) References Cited

U.S. PATENT DOCUMENTS

| | | | |
|---|---|---|---|
| 5,637,413 A | * | 6/1997 | Fernandez et al. ............. 429/7 |
| 5,789,902 A | * | 8/1998 | Abe et al. ................... 320/134 |
| 5,909,101 A | * | 6/1999 | Matsumoto et al. ........ 320/110 |
| 6,064,184 A | * | 5/2000 | Tamai ........................ 320/134 |
| 6,084,382 A | * | 7/2000 | Hite ............................ 320/116 |
| 6,331,763 B1 | * | 12/2001 | Thomas et al. ............. 320/136 |
| 6,472,849 B1 | * | 10/2002 | Smith ........................ 320/138 |

* cited by examiner

Primary Examiner—Brian Sircus
Assistant Examiner—Danny Nguyen
(74) Attorney, Agent, or Firm—Brett A. Hertzberg; Merchant & Gould (57) ABSTRACT

A system and method is related to charger systems that require fault protection at an input terminal. A clamp circuit is activated when the power source is detected as disconnected from the system. The clamp circuit operates as a clamp that limits the input voltage by shunting current away from the input terminal. The clamp circuit operates as a standby protection circuit that may be part of shunt regulator and/or a crowbar system in a shunt regulator. The clamp circuit prevents an "in-rush" of current from creating a dangerous condition in a charging device (i.e., battery operated) when the power source is initially engaged. The clamp circuit is deactivated when the detected power supply voltage is above a battery voltage of the device.

18 Claims, 4 Drawing Sheets

SYSTEM AND METHOD OF CLAMPING A CHARGER INPUT WHEN NO CHARGER IS DETECTED

FIELD OF THE INVENTION

The present invention is related to charger circuits for battery cells. More particularly, the present invention is related to a protection circuit that clamps the charger circuit input when a no power source is detected.

BACKGROUND OF THE INVENTION

Rechargeable lithium bases batteries, including Lithium-Ion batteries and Lithium-Polymer batteries, are used in portable applications such as cellular telephones. Lithium batteries are sensitive to excessive voltages. Without a suitable safety circuit overcharging may compromise the batteries reliability. A shunt regulator is often employed to regulate the charging voltage to the lithium battery.

Figure 1:
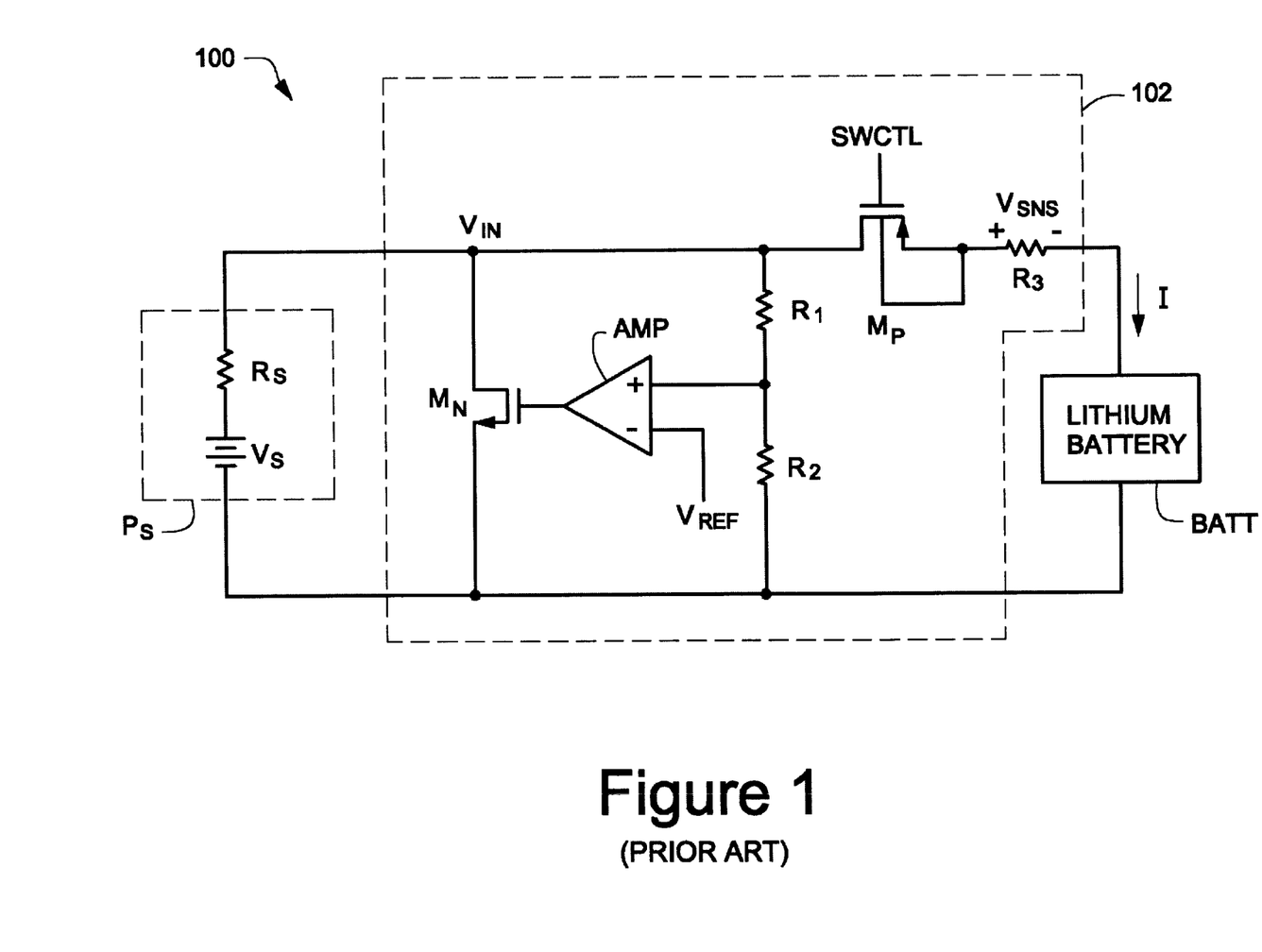
FIG. 1 is a schematic diagram of a conventional lithium battery charging system.

An example shunt regulator charging system for a lithium battery is shown in FIG. 1. As shown in FIG. 1, the shunt regulator charging system includes a power source (PS), a shunt regulator (102), and a lithium battery (BATT). The power source (PS) includes a voltage source (VS) and a source resistance (RS). The shunt regulator (102) includes a NMOS transistor (MN), a PMOS transistor (MP), an amplifier (AMP), and three resistors (R1–R3).

In operation the power source provides a charging current (I) to the lithium battery through source resistance RS, PMOS transistor MP, and resistor R3. Resistor R3 converts the charging current (I) into a voltage (VSNS), which is used by other circuitry (not shown) to control the activation of transistor MP. PMOS transistor MP is activated during normal charging operations. Resistors R1 and R2 form a voltage divider that provide a feedback signal to amplifier AMP. Amplifier AMP compares the feedback signal to a reference voltage (VREF) and provides a control signal to transistor MN. Transistor MN, amplifier AMP, and resistors R1–R2 together operate as a shunt regulator that regulates the input voltage (VIN). The shunt regulator provides safe charging of lithium battery BATT by limiting the charging voltage (input voltage) similar to a zener diode.

SUMMARY OF THE INVENTION

A system and method is related to charger systems that require fault protection at an input terminal. A clamp circuit is activated when the power source is detected as disconnected from the system. The clamp circuit operates as a clamp that limits the input voltage by shunting current away from the input terminal. The clamp circuit operates as a standby protection circuit that may be part of shunt regulator and/or a crowbar system in a shunt regulator. The clamp circuit prevents an "in-rush" of current, due to a fault in the regulator, from creating a dangerous condition in a charging device (i.e., battery operated) when the power source is initially engaged. The clamp circuit is deactivated when the detected power supply voltage is above a battery voltage of the device.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal. The meaning of "a", "an", and "the" include plural references. The meaning of "in" includes "in" and "on". Also, "battery" includes single cell batteries and multiple cell batteries.

Figure 2:
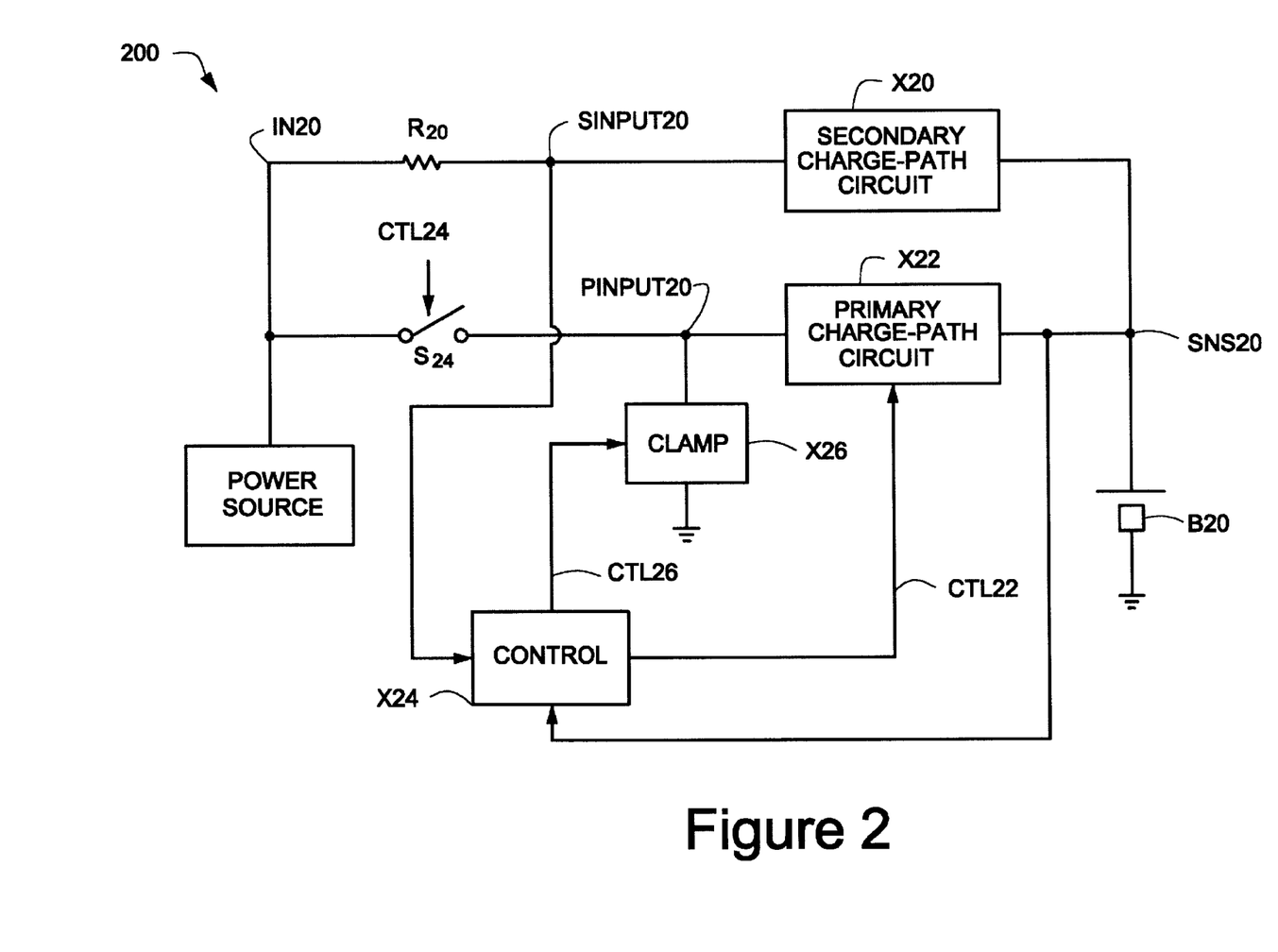
FIG. 2 is a schematic diagram of an exemplary charger system including protection circuitry.

FIG. 2 is a schematic diagram of an exemplary charger system (200) that is arranged in accordance with the present invention. The charger system (200) includes a power source, a resistor (R20), a switching circuit (S24), a secondary charge-path circuit (X20), a primary charge-path circuit (X22), a control circuit (X24), a controlled clamp circuit (X26), and a battery (B20). The charger system (200) may be implemented, in part or whole, as an integrated circuit.

The power source is coupled to node IN20. The resistor (R20) is coupled between node IN20 and node SINPUT20. The secondary charge-path circuit (X20) is coupled between node SINPUT20 (the secondary input) and node SNS20. Switching circuit S24 is coupled between node IN20 and node PINPUT20, and is arranged to actuate in response to control signal CTL24. The primary charge-path circuit (X22) is coupled between node PINPUT20 (the primary input) and node SNS20. The clamp circuit is coupled between the input of the primary charge-path circuit (X22) and a circuit ground, and is activated in response to a clamp control signal (CTL20). Control circuit X24 is arranged to sense signals at node SNS20 and SINPUT20, and provide control signals CTL22 and CTL26. Battery B20 is coupled between node SNS20 and the circuit ground.

A normal charging operating mode is active when the voltage associated with battery B20 is higher than a predetermined battery voltage. The predetermined battery voltage corresponds to a minimum voltage level for which regulation is possible in the system. For example, a regulator system may require a minimum of 2V before the regulator operates properly. The regulator's minimum operating voltage may be the result of transistor threshold voltages, and minimum gains required for stable operation.

In the normal charging mode, a power source is connected to the system at node IN20 to provide an energy source for charging battery B20. Switch S24 is closed, energy is provided from the power source through switch S24 to the primary input (PINPUT20), and primary charge-path circuit X22 is operational. Control circuit X24 is arranged to monitor the battery voltage at node SNS20. Control circuit X24 cooperates with primary charge-path circuit X22 via control signal CTL22 to provide regulation of the charge delivered to battery B20 through a primary conduction path.

A low-cell charging mode is active when the voltage associated with battery B20 is below the predetermined battery voltage. Secondary charge-path circuit X20 is an optional circuit that may be employed to provide an alternate current path (secondary conduction path) in the low-cell charging mode. Control circuit X24 is arranged to disable the primary charge-path circuit (X22) when the battery voltage is below the predetermined battery voltage. Energy is provided from the power source through resistor R20 to the secondary input (SINPUT20). Current flows from the power source through resistor R20 and secondary charge-path circuit X20 to the battery. Resistor R20 will limit the current that flows to battery B20. Thus, the secondary charge-path circuit and resistor R20 provide a "trickle" current to the battery until the battery voltage is sufficiently high for the normal operating mode to be activated.

A standby mode (or protection mode) is active when the power source is disabled or disconnected from the system. A battery in a portable device such as a cellular telephone is normally returned to a power source base (i.e., a charger base such as a cradle for the telephone, a cigarette lighter adapter, or some other power source that is physically connected to the portable device) only when the portable device is not in use. During normal use of the portable device, the battery and the associated circuitry are removed from the power source base such that they are physically decoupled from one another. The charger system (200) detects when the battery is returned to the power source base by monitoring various voltages.

In one example, the standby mode is active when the power source is coupled to the charger system. For example, a power source such as a cigarette lighter adapter in a car may remain coupled to the charger system even though the adapter is not coupled to the car battery (i.e., the cigarette lighter adapter is not plugged in). In this instance, the charger system does not receive any power from the car battery even though the adapter is coupled to the charger system. When the power source corresponds to a power adapter such as the cigarette lighter adapter, the standby mode is active when the power source is inactive while coupled to the charger system.

Control circuit X24 is arranged to monitor the voltage at node SINPUT20 (the secondary input). The standby mode is active when the battery voltage (SNS20) is sensed to be below the secondary input (SINPUT20) voltage. Control circuit X24 cooperates with clamps circuit X26 via control signal CTL26 such that clamp circuit X26 is activated in the standby mode. Clamp circuit X26 is arranged to clamp any input voltages present in the system when active.

The standby mode provides protection from an "in-rush" of current when the portable device is returned to the power source base and a fault occurs that prevents appropriate regulation in the charger system (200). For example, a power source voltage of 12V may be utilized from a car battery. Delivering 12V to a lithium-Ion battery may result in a destroyed battery or another dangerous condition such as an explosion. Clamp circuit X26 is arranged to operate as a voltage clamp to limit the charge delivered to the battery when initially engaged with the power source base. A failure mode may exist in the system when switching circuit S24 is shorted or improperly activated. Clamp circuit X26 is also arranged to protect the battery in the failure mode. When the power source is subsequently connected to the power source, the clamp already engaged such that any failure that may occur in the system cannot cause a dangerous condition or damage in the battery.

Figure 3:
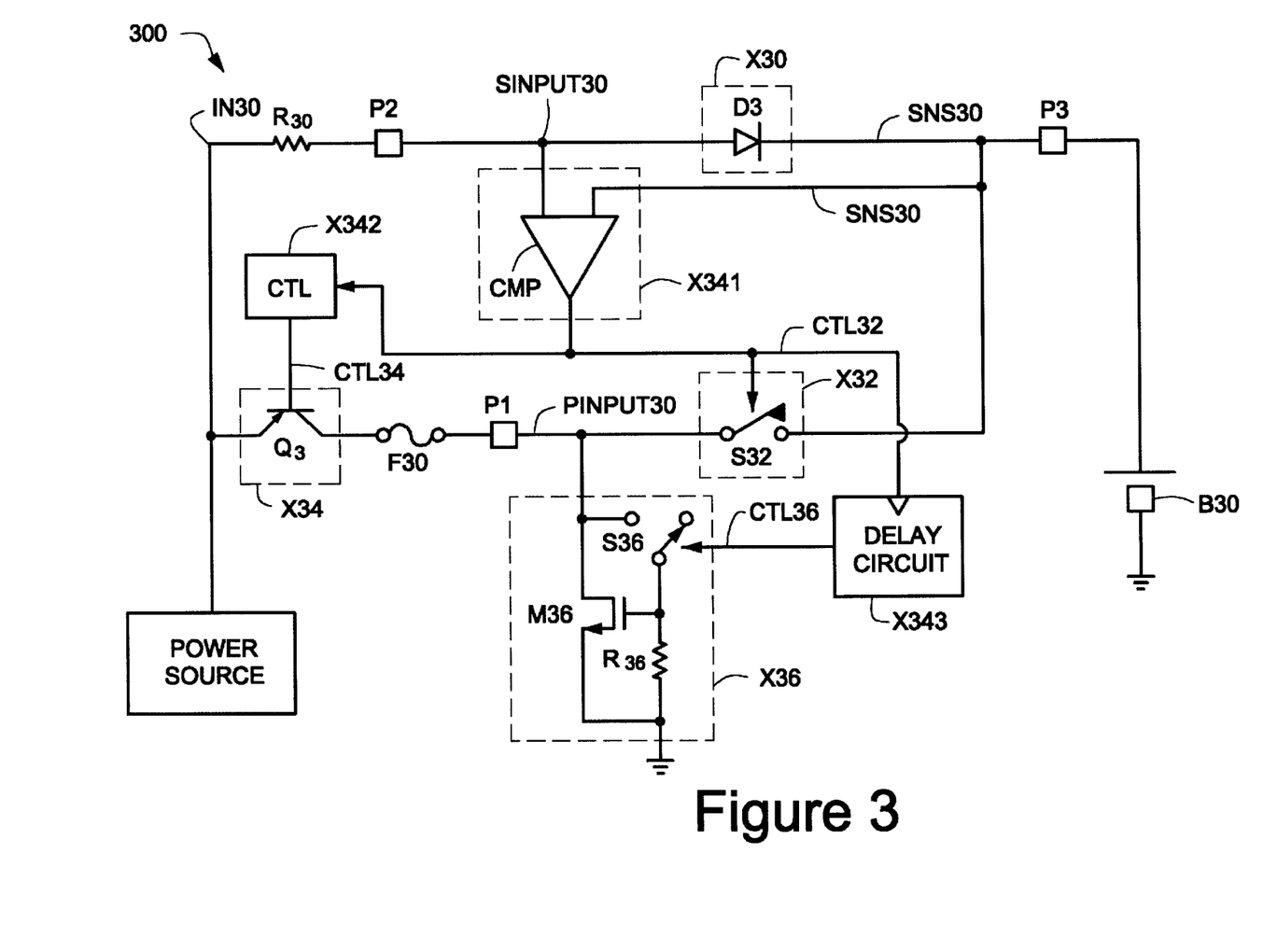
FIG. 3 is a schematic diagram of another exemplary charger system that includes protection circuitry.

FIG. 3 is a schematic diagram of another exemplary charger system (300) that is arranged in accordance with the present invention. The charger system (300) includes a power source, a resistor (R30), a fuse circuit (F30), a switching/regulation circuit (X34), a secondary charge-path circuit (X30), a primary charge-path circuit (X32), a detector circuit (X341), a control circuit (X342), a delay circuit (X343), a controlled clamp circuit (X36), and a battery (B30). The charger system (300) may be implemented, in part or whole, as an integrated circuit, or as a circuit module. Pins P1–P3 are included when the integrated circuit is utilized as a module or integrated circuit in a charger system.

The power source is coupled to node IN30. The resistor (R30) is coupled between node IN30 and node SINPUT30 at pin P2. The secondary charge-path circuit (X30) is coupled between node SINPUT30 at pin P2 and node SNS30 at pin P3. The power source is coupled to node PINPUT30 at pin P1 through switching/regulation circuit X34 and fuse F30, which are connected in series. Switching/regulation circuit X34 is responsive to control signal CTL34. The primary charge-path circuit (X32) is coupled between node PINPUT30 (at pin P1) and node SNS30 (at pin P3), and is arranged to actuate in response to control signal CTL32. The clamp circuit (X36) is coupled between node PINPUT30 (at pin P1) and a circuit ground, and is activated in response to control signal CTL36. Detector circuit X341 is arranged to sense signals at node SNS30 (pin P3) and node SINPUT30 (pin P2), and provide control signal CTL32. Control circuit X342 (CTL) is arranged to receive control signal CTL32, and provides control signal CTL34. Delay circuit X343 is arranged to receive control signal CTL32, and provides control signal CTl36. Battery B30 is coupled between node SNS30 and the circuit ground.

In operation, primary charge-path circuit X32 is arranged to operate as a controlled switch (i.e., S32) that is actuated in response to control signal CTL32. Charge is delivered to battery B30 from the power source through switching/regulation circuit X34, fuse F30, and primary charge-path circuit X32. Detector circuit X341 senses the potential of the battery (B30) at pin P3 (sense voltage SNS30) and the potential of the power source (hereinafter referred to as the supply voltage) at pin P2 (secondary input SINPUT30). Detector circuit X341 provides control signal CTL32 in response to a comparison between the sense voltage and the supply voltage (as sensed at pin P2). The control circuit (X342) is arranged such that primary charge-path circuit (X32) is activated to permit charge to flow (i.e., switch S32 is closed) from pin P1 to pin P3 when the supply voltage (SINPUT30) is greater than the sense voltage (SNS30). The primary charge-path circuit (X32) breaks the charge flow (i.e., switch S32 is open) when the supply voltage (SINPUT30) is less than the sense voltage (SNS30).

In one example, primary charge-path circuit X32 operates as a closed switch (S32) and switching/regulation circuit X34 operates as a regulator that regulates the charge flow from the power source to battery B30 during a normal charging operation. Switching/regulator circuit X34 may include a P-type transistor (i.e., Q3), such as a PNP bipolar junction transistor (BJT) that is configured to operate as a linear regulator in response to control signal CTL34. However, the battery voltage (as sensed by the sense voltage at node SNS30) may be deeply discharged such that regulation of the charge flow through primary charge-path circuit X32 is not possible. Since regulation is not possible, the secondary charge-path circuit X30 is arranged to provide an alternate charge conduction path from the power source to battery B30 such that the battery is charged with a low current when deeply discharged.

Secondary charge-path circuit X30 is an optional circuit that may not be necessary for a particular system. When the secondary charge-path circuit (x30) is utilized, it may be represented as a diode (D3) as shown in FIG. 3. The diode (D3) is active when forward biased. Diode D3 is forward biased when the battery voltage (sense voltage SNS30) at pin P3 is below the supply voltage (SINPUT30) at pin P2 by a predetermined amount. The predetermined amount corresponds to the threshold voltage of the diode (D3). A conduction path is formed from the power source, through resistor R30, through diode D3, and to battery B30 when diode D3 is active. Resistor R30 is an optional resistance circuit that may be arranged to provide a current limit to the charge flow delivered to the battery from the power source. Also, resistor R30 is arranged to isolate the voltage of the power source from pin P2 such that supply voltage sensed at pin P2 will be limited. When charger system 300 is implemented as an integrated circuit, the limit of the voltage at pin P2 may be dictated by semiconductor processing parameters such as, for example, maximum voltage before breakdown, or some other latch-up based voltage and current limit.

Controlled clamp circuit X36 is arranged to selectively operate as a voltage clamp. Control signal CTL36 is utilized to selectively activate and deactivate the voltage clamp. In one example, controlled clamp circuit X36 is operated as a clamp when supply voltage SINPUT30 is lower than sense voltage SNS30, and controlled clamp circuit X36 is disabled when supply voltage SINPUT30 is greater than sense voltage SNS30. In another example, controlled clamp circuit X36 is operated as a clamp when the power source is detected as either disconnected or deactivated. The power source may be detected as disconnected or deactivated by monitoring the current in the secondary charge-path circuit (X30), monitoring the voltage across the secondary charge-path circuit (X30), or any other suitable way.

Detector circuit X341 is arranged to detect the condition of the power source. In one example, detector circuit X341 includes a comparator circuit (CMP). The comparator circuit is arranged to compare the secondary input (SINPUT30) voltage at pin P2 to the sense voltage (SNS30) at pin P3. The power source is detected as present when the voltage across pins P2 and P3 exceeds a predetermined amount such that the power source must be present.

Delay circuit X343 is an optional circuit that is arranged to delay the transition between the deactivation of the primary charge-path circuit (X32) and the activation of the controlled clamp circuit X36. Delay circuit X343 has an associated delay time (dt) between a transition in control signal CTL32 (either rising or falling, but not necessarily both) and a transition in control signal CTL36. The delay time (dt) may be determined by the maximum turn-off time for primary charge-path circuit X32, such as the turn-off time for switching circuit S32. The delay circuit (X343) may be utilized to ensure that the controlled clamp circuit (X36) does not activate while the primary charge-path circuit (X36) is still active. Delay circuit X343 may be unnecessary for certain systems where the primary charge-path circuit is deactivated sufficiently fast to avoid active operation of both the controlled clamp circuit (X36) and the primary charge-path circuit (X32).

According to one embodiment, controlled clamp circuit X36 is configured to operate as a shunt regulator when supply voltage (SINPUT30) is greater than the sense voltage (SNS30). In another embodiment, controlled clamp circuit X36 is disabled when the supply voltage (SINPUT30) is greater than the sense voltage (SNS30).

An example controlled clamp circuit X36 is illustrated in FIG. 3. Controlled clamp circuit X36 includes a controlled switching circuit (S36), a resistor (R36), and a transistor (M36). Transistor M36 is illustrated as an N-type metal oxide semiconductor field effect device (MOSFET). However, other transistor devices may be employed such as a bipolar junction device (BJT), a junction field effect device (JFET), a GaAs FET, or another type of solid state device that may be configured to operate as a controlled diode.

The power source is initially disengaged (or decoupled from the remaining circuitry) such that switching/regulation circuit X34 does not conduct any current. The supply voltage SINPUT30 will be lower than the cell voltage while the power source is disengaged, resulting in the activation of controlled clamp circuit X36. The controlled clamp circuit (X36) limits the voltage at pin P1 when the power source is engaged such that the battery (B30) will not result in a dangerous condition when a fault occurs. For example, transistor Q3 may have an operational problem that is due to a manufacturing/processing defect such that the collector and emitter of transistor Q3 is short-circuited. In this example, pin P1 may be exposed to excessively high voltages from the power source resulting in damage to the regulator, damage to the battery, or some other problem. Since controlled clamp circuit X36 is engaged prior to connection of the power source, the clamp operates as a crowbar that clamps the voltage such that fuse F30 will "clear" prior to damaging the regulation system and/or the battery. The clamp will be disengaged to permit normal operation when the power source has been detected as active.

Resistor R36 is arranged to "pull" charge out of the gate of transistor M36 to ground when transistor M36 is inactive. Switching circuit S36 is arranged to selectively couple the gate and source terminals of transistor M36 together when actuated. Switching circuit S36 is actuated in response to control signal CTL32 such that transistor M36 is configured as a diode circuit that is coupled to pin P1 when the supply voltage (SINPUT30) is lower than the sense voltage (SNS30) at pin P3.

In one example, the power source is a non-compliant power source. A non-compliant power source corresponds to a power source that has an inappropriate power supply voltage for a given system. An exemplary non-compliant power source has a power supply voltage that may potentially damage the battery (i.e., from a car battery) or cause a dangerous condition as in a Lithium-Ion battery (i.e. fire, destruction of the battery, explosion, etc.). The clamp is activated prior to connecting to the power source since the supply voltage as detected at pin P2 is lower than the battery voltage as sensed at pin P3. When the power source is connected, a rush of current flows that would flow to the battery is shunted through the controlled clamp circuit (X36) to ground (or another potential as may be desired), limiting the voltage at pin P1. Fuse F30 and controlled clamp circuit X36 operate similar to a crowbar circuit such that the fuse is required to "clear" when an excessive current is maintained by the controlled clamp circuit X36.

Figure 4:
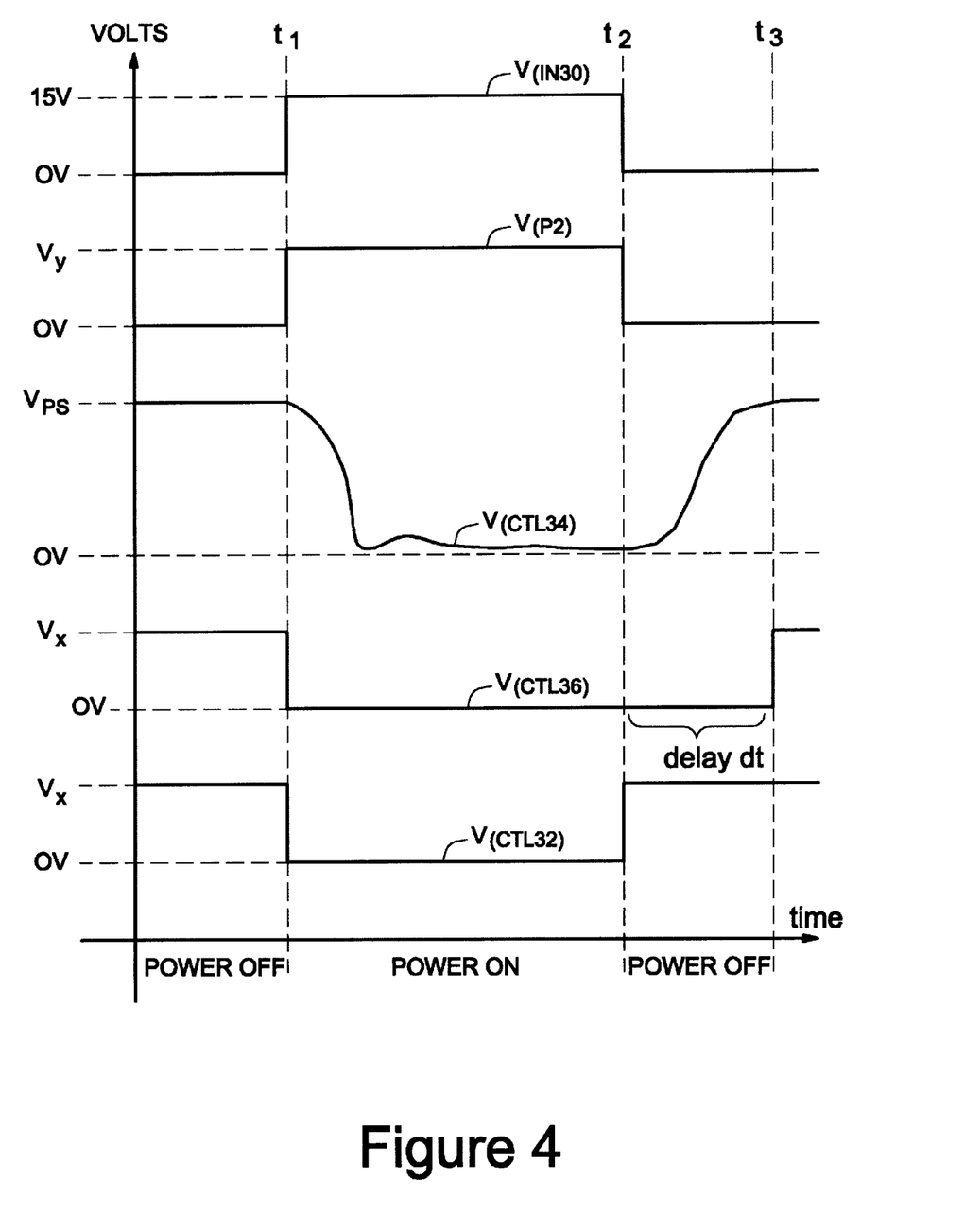
FIG. 4 is a timing diagram of various waveforms for the exemplary charger system that is illustrated in FIG. 3, in accordance with the present invention.

FIG. 4 is a timing diagram of various waveforms for the exemplary charger system that is illustrated in FIG. 3. As shown in FIG. 4, the power in the system is initially disabled (POWER OFF). At time t1, power to the charger system (300) is enabled (POWER ON). At time t2, power to the charger system (300) is again disabled (POWER OFF).

Initial Power Off (Time<t1)

Initially, no power is coupled to the power source node (IN30), resulting in a voltage of V(IN30)=0V. The secondary input (SINPUT30) at pin P2 has a voltage corresponding to V(P2)=0V. Control signals CTL32 and CTL34 have voltages corresponding to V(CTL32)=0V, and V(CTL34)=Vps, where Vps is a voltage that is arranged to disable switching/regulation circuit X34 (i.e., V(IN30)). Control signal CTL36 has a voltage corresponding to V(CTL36)=Vx, where Vx is determined by the battery voltage (i.e., V(SNS30)).

Control circuit X342 is disabled when CTL32 has a voltage corresponding to V(CTL32)=0V. Primary charge-path circuit X342 is disabled by control signal CLT32 such that there is normally (i.e., when no short circuit type of failure is present) an open circuit (i.e., switch S32 is open circuit) between pin P1 and pin P3. Controlled clamp X36 is enabled when control signal CTL36 has voltage corresponding to V(CTL36)=Vx. For example, switch S36 is closed by control signal CTL36, and transistor M36 is configured to operate as a diode circuit that is coupled to the primary input (PINPUT30). In the event that the control circuit (X342) improperly activates switching/regulator circuit X34, or in the event that the switching/regulator circuit X34 is shorted (i.e., PNP Q3 has a shorted collector and emitter), the clamp circuit is activated to provide protection.

Power On (t1<time<t2)

When a power source (i.e., a 15V power source) is coupled to the power source node (IN30), this results in a voltage of V(IN30)=15V. The secondary input (SINPUT30) at pin P2 has a voltage corresponding to V(P2)=Vy, where Vy is determined by battery voltage V(SNS30) and the voltage of the secondary charge path circuit (i.e., VD3—the diode voltage). Control signal CTL32 and control signal CTL36 have voltages corresponding to V(CTL32)=0V and V(CTL36)=0V.

At time t1, control circuit CTL X342 is enabled by control signal CTL32. Controlled clamp circuit X36 is disabled by control signal CTL36, and primary charge-path circuit X32 is enabled. Control signal CTL34 initially has a voltage corresponding to V(CTL34)=Vps at time t1. However, control signal CTL34 gradually changes between time t1 and t2 until corresponding voltage V(CTL34) controls switching/regulation circuit X34 to provide a proper voltage and/or current delivered to pin P1. Control signal CTL34 is a slowly changing analog signal. When switching/regulation circuit X34 is fully activated (i.e., operating as a closed switch), control signal CTL34 has a voltage corresponding to approximately 0V.

Power Off (time>t2)

At time t2 the power source is decoupled from the power source node (IN30), resulting in a voltage of V(IN30)=0V. The secondary input (SINPUT30) at pin P2 has a voltage corresponding to V(P2)=0V. Control signal CTL32 has a voltage corresponding to V(CTL32)=0V. Control signal CTL36 initially (from t2<time<t3) has a voltage corresponding to V(CTL36)=0V.

As illustrated in FIG. 3, control signal CTL36 does not change at the same time as control signal CTL32. Instead, control signal CTL36 changes a short delay time (dt) after control signal CTL32 changes, where dt is determined by the difference between times t2 and t3. Primary charge-path circuit X32 may have a turn-off time that is not very fast. The delay is utilized to prevent controlled clamp X36 and primary charge-path circuit X32 from being active at the same time. Control signal CTL32 changes at time t2, which deactivates the primary charge-path circuit, and control signal CTL36 remains unchanged from time t2 through time t3 such that the controlled clamp remains inactive for this time interval. At time t3, controlled clamp circuit X36 is again activated, since primary charge-path circuit X32 is now disabled.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for protecting a charger system when a power source is deactivated, wherein the charger system is arranged to charge a battery when the power source is activated, comprising:

a primary input that is arranged to selectively receive energy from the power source;

a switching circuit that is arranged to selectively couple the power source to the primary input when enabled;

a primary charge-path circuit that is arranged to selectively couple power from the primary input to the battery when enabled, such that the battery is selectively charged by a primary charging current;

a controlled clamp circuit that is coupled to the primary input, wherein the controlled clamp is arranged to selectively limit a voltage associated with the primary input when enabled; and a control circuit that is arranged to enable the controlled clamp circuit when the power source is deactivated, enable the primary charge-path circuit when the power source is activated, and enable the switching circuit when the power source is activated such that the controlled clamp provides a voltage limit to the primary input, whereby the controlled clamp protects the charger system from a short circuit condition in the switching circuit.

2. An apparatus as in claim 1, wherein the power source is deactivated when the power source is decoupled form the charger system.

3. An apparatus as in claim 1, wherein the power source is deactivated when the power source is coupled to the charger system.

4. An apparatus as in claim 1, the control circuit further comprising a detector circuit that is arranged to provide a first control signal when the power source is active, wherein the first control signal is arranged to activate the primary charge-path circuit.

5. An apparatus as in claim 4, wherein the detector circuit includes a comparator circuit that is arranged to compare a voltage associated with the battery and a voltage associated with the power source, wherein the control circuit is arranged to enable the controlled clamp when the voltage associated with the battery exceeds the voltage associated with the power source, and the control circuit is arranged to enable the primary charge-path circuit when the voltage associated with the power source exceeds the voltage associated with the battery.

6. An apparatus as in claim 4, further comprising a delay circuit that is arranged to provide a second control signal in response to the first control signal, wherein the second control signal is arranged to activate the controlled clamp circuit.

7. An apparatus as in claim 4, wherein the first control signal changes at a time when the power source is deactivated, and the second control signal remains unchanged until a delay time has elapsed after the power source is deactivated.

8. An apparatus as in claim 1, the controlled clamp circuit further comprising a transistor that is inactive when the power source is activated, wherein the transistor is configured to operate as a diode circuit when the power source is deactivated.

9. An apparatus as in claim 1, the switching circuit further comprising a transistor that is arranged to operate as a switch when enabled.

10. An apparatus as in claim 1, the switching circuit further comprising a transistor that is arranged to operate as a linear regulator when enabled.

11. An apparatus as in claim 1, the switching circuit further comprising a transistor that is arranged to operate as a linear regulator when enabled.

12. An apparatus as in claim 1, further comprising:
a secondary input that is arranged to receive energy from the power source; and
a secondary charge-path circuit that is arranged to selectively couple power from the secondary input to the battery when enabled, such that the battery is selectively charged by a secondary charging current.

13. An apparatus as in claim 12, the control circuit further comprising a detector circuit that is arranged to provide a control signal when a voltage associated with the secondary input exceeds a voltage associated with the battery.

14. An apparatus as in claim 1, wherein the controller circuit further comprising a normal charging mode, a low-cell charging mode, and a standby mode, wherein the primary charge-path circuit is enabled in the normal charging mode, the secondary charge-path circuit is enabled in the low-cell charging mode, and the controlled clamp circuit is enabled in the standby mode.

15. An apparatus as in claim 14, wherein the controller circuit activates the low-cell mode when the power supply is activated and the voltage associated with the battery is below a predetermined amount, the normal charging mode is activated when the power supply is activated and the voltage associated with the battery is above the predetermined amount, and the standby mode is activated when the power supply is deactivated.

16. An apparatus as in claim 14, wherein the controller circuit activates the low-cell mode when the power supply is activated and the voltage associated with the battery is below a predetermined amount, the normal charging mode is activated when the power supply is activated and the voltage associated with the battery is above the predetermined amount, and the standby mode is activated a delay time after the power supply is deactivated.

17. An apparatus for protecting a charger system when a power source is deactivated, wherein the charger system is arranged to charge a battery when the power source is activated, comprising:
a means for selectively coupling energy that is arranged to selectively couple energy from a power source to a primary input when enabled;
a means for providing a primary charging current that is arranged to provide a primary charging current from the primary input to the battery when enabled;
a means for clamping that is arranged to selectively limit a voltage associated with the primary input when enabled; and
a means for controlling that is arranged to enable the means for clamping when the power source is deactivated, enable the means for providing a primary charging current when the power source is activated, and enable the means for selectively coupling energy when the power source is activated such that the means for clamping provides a voltage limit to the primary input.

18. A method of protecting a charger system when a power source is deactivated, wherein the charger system is arranged to charge a battery when the power source is activated, comprising:
coupling energy from a power source to a primary input when enabled;
providing a primary charging current from the primary input to the battery when a primary charge-path is enabled;
clamping a voltage associated with the primary input by enabling a clamp circuit; and
activating the clamp circuit when the power source is deactivated;
deactivating the clamp circuit when the power source is activated;
activating the primary charge-path when the power source is activated; and
deactivating the primary charge-path when the power source is deactivated.

* * * * *

UNITED STATES PATENT AND TRADEMARK OFFICE
CERTIFICATE OF CORRECTION

PATENT NO. : 6,570,746 B1
DATED : May 27, 2003
INVENTOR(S) : Smith

It is certified that error appears in the above-identified patent and that said Letters Patent is hereby corrected as shown below:

<u>Column 8,</u>
Line 32, "decoupled form the" should read -- decoupled from the --

Signed and Sealed this

Twenty-eighth Day of October, 2003

JAMES E. ROGAN
*Director of the United States Patent and Trademark Office*